United States Patent
Kotalik et al.

(10) Patent No.: US 12,425,369 B1
(45) Date of Patent: Sep. 23, 2025

(54) REFLEX-REACTION SERVER LEAKAGE CONTAINMENT SYSTEM

(71) Applicant: Celerium Inc., Torrance, CA (US)

(72) Inventors: Karl Peter Kotalik, Tucson, AZ (US); Aubrey Grant Chernick, Los Angeles, CA (US)

(73) Assignee: Celerium Inc, Torrance, CA (US)

( * ) Notice: Subject to any disclaimer, the term of this patent is extended or adjusted under 35 U.S.C. 154(b) by 0 days.

(21) Appl. No.: 18/769,102

(22) Filed: Jul. 10, 2024

(51) Int. Cl.
*H04L 29/06* (2006.01)
*G06F 21/55* (2013.01)
*H04L 9/40* (2022.01)

(52) U.S. Cl.
CPC ........ *H04L 63/0236* (2013.01); *G06F 21/556* (2013.01)

(58) Field of Classification Search
CPC .......................... H04L 63/0236; G06F 21/556
See application file for complete search history.

(56) References Cited

U.S. PATENT DOCUMENTS

| | | | |
|---|---|---|---|
| 8,250,624 B2 | 8/2012 | Lamotte | |
| 8,873,753 B2* | 10/2014 | Parker | H04W 12/088 380/250 |
| 10,735,455 B2* | 8/2020 | Crisler | H04L 63/1408 |
| 11,201,728 B1* | 12/2021 | Bouchard | H04L 9/0637 |
| 2007/0261112 A1* | 11/2007 | Todd | H04L 63/1483 726/2 |
| 2007/0271422 A1* | 11/2007 | Osaki | G06F 21/568 711/154 |
| 2008/0126795 A1* | 5/2008 | Miao | H04L 63/0428 713/151 |
| 2009/0249472 A1* | 10/2009 | Litvin | H04L 63/0263 726/14 |
| 2010/0251363 A1 | 9/2010 | Todorovic | |
| 2012/0102568 A1* | 4/2012 | Tarbotton | G06F 21/552 726/23 |
| 2013/0103834 A1 | 4/2013 | Dzerve et al. | |
| 2016/0036838 A1* | 2/2016 | Jain | H04L 63/1416 726/23 |

(Continued)

OTHER PUBLICATIONS

DoD Zero Trust Strategy, Department of Defense, Oct. 21, 2022, Cleared for Open Publication Nov. 7, 2022, Office of Prepublication and Security Review.

(Continued)

*Primary Examiner* — Dao Q Ho
(74) *Attorney, Agent, or Firm* — Bednarek Legal, PLLC (57) ABSTRACT

A segmented local area network with reflex-reaction server leakage containment system includes a segmented local area network (LAN) and a reflex-reaction server leakage containment system. The LAN includes an internal zone with at least one internal server, and a perimeter firewall developing firewall traffic data and being responsive to a block list of internet protocol (IP) addresses. The reflex-reaction server leakage containment system stores a LAN server metadata (LSM) table, is receptive to the firewall traffic data and is operative to automatically update the block list with at least one of an IP address of the at least one internal server and an IP address of an external destination server when a data leakage through the perimeter firewall from the at least one internal server to the external destination server is detected.

16 Claims, 7 Drawing Sheets

(56) References Cited

U.S. PATENT DOCUMENTS

| | | | |
|---|---|---|---|
| 2017/0083717 A1* | 3/2017 | Medvedev | H04L 63/0428 |
| 2018/0270109 A1* | 9/2018 | Hollis | H04L 41/0803 |
| 2018/0295033 A1* | 10/2018 | Vladimirskiy | H04L 43/20 |
| 2019/0213325 A1 | 7/2019 | Mckerchar et al. | |
| 2019/0215331 A1* | 7/2019 | Anakata | H04L 41/046 |
| 2019/0268317 A1 | 8/2019 | Haelion | |
| 2019/0319928 A1* | 10/2019 | Nesbit | H04L 51/00 |
| 2020/0120121 A1* | 4/2020 | Aggarwal | H04W 88/16 |
| 2020/0127975 A1* | 4/2020 | Burgess | H04L 9/0894 |
| 2020/0169537 A1* | 5/2020 | Lee | H04L 63/0236 |
| 2020/0301917 A1* | 9/2020 | Niu | G06F 9/54 |
| 2022/0078006 A1* | 3/2022 | Krishnamurthy | H04L 9/3239 |
| 2022/0131835 A1* | 4/2022 | Fenton | H04L 63/0236 |
| 2023/0057332 A1* | 2/2023 | Cantrell | H04L 63/0218 |
| 2023/0188408 A1* | 6/2023 | Pick | H04L 41/16 709/224 |
| 2024/0106693 A1* | 3/2024 | Toms | H04L 41/22 |

OTHER PUBLICATIONS

IBM/Ponemon Institute. report entitled "Cost of a Data Breach Report 2022", IBM Corporation, Jul. 2022.

* cited by examiner

| LAN SERVER METADATA |||
|---|---|---|
| IP ADDRESS(ES) | HUMAN READABLE NAME | PRIVACY LEVEL (P/L) |
| IP1 | PROXY | 0 |
| IP2 | EMAIL | 0 |
| IP3 | WEB SERVER | 0 |
| IP4 | APPLICATION SERVER | 1 |
| IP5 | DATABASE SERVER | 1 |
| IP RANGE 1 | INTERNAL | 2 |
| IP RANGE 2 | CROWN JEWEL | 3 |

REFLEX-REACTION SERVER LEAKAGE CONTAINMENT SYSTEM

BACKGROUND

Computers and networks of computers are coming under increasingly sophisticated attacks by entities (often referred to as "hackers") who gain unauthorized access to computers and/or network devices. The tools, tactics, techniques, and procedures of hackers are rapidly growing in sophistication, enabling activities from initial compromise, command and control, persistence, and data exfiltration to go unnoticed by cybersecurity and IT teams and the traditional tools they utilize. Hackers are skilled in creating attack vectors that trick employees and individual users into opening malicious attachments or links and freely giving up sensitive personal or company data on internal servers of the organization. Attack vectors include sharing malware and viruses, malicious email attachments and web links, phishing, pop-up windows, text messages, and instant messages. A problem with many detection techniques is that they can take days, weeks, or even years to identify an infiltration and often require human intervention to correct the problem.

A "flat network" refers to an architecture where all computer devices can connect directly to each other. Flat networks provide fast and reliable connectivity for connected devices. Security efforts for flat networks generally focus on isolating an internal network (e.g., a local area network or LAN) from an external network (e.g., a wide area network or WAN such as the internet) with a "perimeter" firewall. This traditional approach can be less than adequate in protecting the complex and sensitive LANs often maintained by large organizations. A key security vulnerability of a flat network is that once hackers successfully compromise the LAN, they often can move laterally from one server to another, potentially gaining access to sensitive servers including important company, financial, personal, or technical data.

In the past, network architects targeted their security strategies at the internal network perimeter, the invisible line that separates the outside world from the data vital to an enterprise's business. Individuals within the perimeter were assumed to be trustworthy and, therefore, not a threat. Thus, they were subject to few restrictions on their ability to access information. Recent high-profile breaches have called that trust assumption into question. For one thing, insiders can indeed be the source of breaches, often inadvertently but sometimes deliberately. In addition, when threats penetrate the perimeter, they are free to move laterally in the network to access virtually any data, application, asset or service. With virtually unhindered access, attackers can easily exfiltrate a full range of valuable assets, often before the breach has even been detected. Because of the inherent weaknesses of assumed trust, many organizations have begun to adopt the Zero Trust strategy, which assumes that nobody is trustworthy by default, even those already inside the network perimeter.

Network segmentation is an architectural approach that divides a computer network into multiple segments or "subnets," each acting as its own small network. Companies use network segmentation to enhance the security of their LANS by creating subnets that reject unnecessary traffic and thereby protect internal (a/k/a "private," "local," etc.) servers storing sensitive data. A breach of a LAN's perimeter firewall should not allow a hacker access to, for example, internal servers on a subnet.

Network segmentation can be implemented as either physical or logical segmentation. As the name implies, physical segmentation involves breaking down a larger computer network into a collection of smaller subnets. A physical or virtual firewall acts as the subnet gateway, controlling which traffic comes in and goes out. Physical segmentation is relatively straightforward to administer because the topology is fixed in the architecture.

Logical segmentation creates subnets using one of two primary methods: virtual local area networks (VLANs) or network-addressing schemes. VLAN-based approaches are fairly straightforward to implement because the VLAN tags automatically route traffic to the appropriate subnet. Network-addressing schemes are equally effective but require a more detailed understanding of networking theory. Logical segmentation is more flexible than physical segmentation because it requires no wiring or physical movement of components to accomplish. Automated provisioning can greatly simplify the configuration of subnets.

While network segmentation can improve the security of internal servers, it can require a high level of sophistication of the LAN designer, e.g., a network engineer. Furthermore, after the LAN is implemented, network administrators can inadvertently reduce the safety afforded by segmentation by adding or moving servers, assigning incorrect firewall ports, changing firewall protocols, etc.

These and other limitations of the prior art will become apparent to those of skill in the art upon a reading of the following descriptions and a study of the several figures of the drawing.

SUMMARY

An example segmented local area network with reflex-reaction server leakage containment system includes a segmented local area network (LAN) and a reflex-reaction server leakage containment system. The LAN includes an internal zone with at least one internal server, and a perimeter firewall developing firewall traffic data and being responsive to a block list of internet protocol (IP) addresses. The reflex-reaction server leakage containment system stores a LAN server metadata (LSM) table, is receptive to the firewall traffic data and is operative to automatically update the block list with at least one of an IP address of the at least one internal server and an IP address of an external destination server when a data leakage through the perimeter firewall from the at least one internal server to the external destination server is detected.

An example reflex-reaction server leakage ("reflex") containment system includes a processor and memory storing local area network (LAN) server metadata and is receptive to perimeter firewall traffic data of the LAN. The memory stores code segments executable on the processor to automatically update a perimeter wall block list with at least one of an IP address of the at least one internal server and an IP address of an external destination server when a data leakage through the perimeter firewall from the at least one internal server to the external destination server is detected.

An example computer-implemented method for automatically blocking data leaks from an internal server includes: (a) obtaining local area network (LAN) server metadata including internet protocol (IP) addresses and privacy levels; (b) obtaining perimeter firewall traffic data of the LAN; (c) determining if there is a data leak from an internal server of the LAN using the LAN server metadata and the perimeter firewall traffic data; (d) automatically blocking the data leak; and (e) repeating operations (b) to (e).

An example non-transitory computer-readable media including program instructions executable on a digital processor for automatically blocking data leaks from an internal server, the program instructions including: (a) code sections obtaining server metadata of a local area network (LAN) including internet protocol (IP) addresses and privacy levels; (b) code sections obtaining perimeter firewall traffic data of the LAN; (c) code sections determining if there is a data leak from an internal server of the LAN using the server metadata and perimeter firewall traffic data; (d) code sections automatically blocking the data leak; and (e) code sections repeating operations (b) to (e).

An advantage of example embodiments is that internal server data leakages through a perimeter firewall of a LAN are quickly identified and automatically contained without human intervention.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
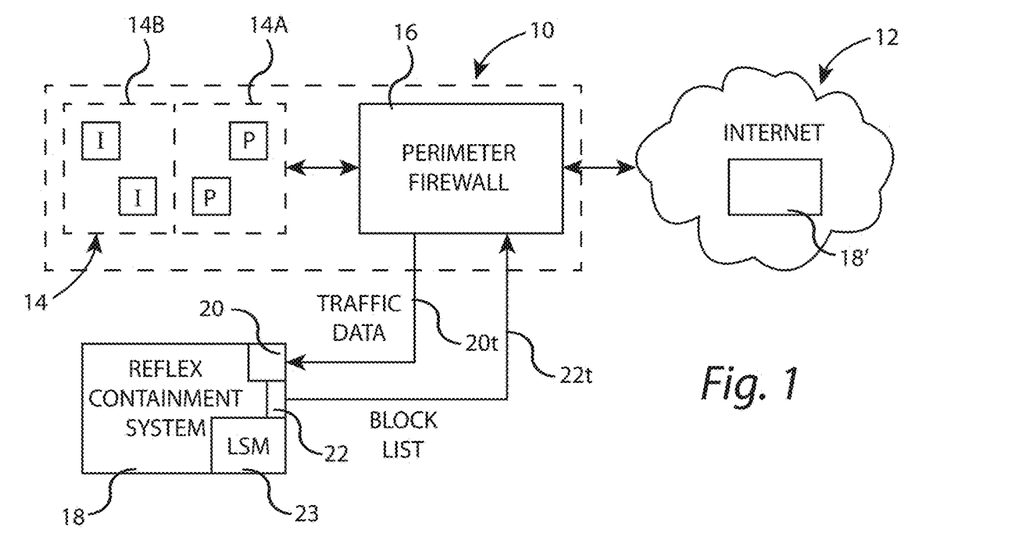
FIG. 1 is a block diagram of an example segmented local area network (LAN) and a reflex-reaction server leakage containment system.

FIG. 1 is a block diagram of an example local area network (LAN) system 10 with internet 12 access including a private network 14 and a perimeter firewall 16 which provides a safe connection to the internet 12. In this example, a subnetwork ("subnet") 14A of private network 14 has public-facing servers "P" that can communicate with the internet 12 via the perimeter firewall 16. The private network 14, in this example, also has a subnet 14B with internal servers "I" that are generally isolated from the internet. During normal operation, the internal servers I should not be able to connect with the internet 12, e.g., data packets originating from internal servers I should never be present at the perimeter firewall 16. Any such erroneous data packets would be considered to be a "data leak," "data leakage" or simply "leakage," from the LAN system 10, and would be indicative of a hacker, infiltrator or other wrongdoer gaining access to sensitive private information of the organization operating the LAN.

With continuing reference to FIG. 1, a reflex-reaction server leakage ("reflex") containment system 18 receives and stores firewall traffic data 20 either directly or indirectly from the perimeter firewall 16 as indicated by transport path 20t. By "reflex-reaction" it is meant that the reflex containment system 18 reacts quickly and automatically to the detection of a data leak ("leakage") to contain the leak. Due to the reflex-like reaction of reflex containment system 18, data leaks can be contained in a matter of minutes on a 24/7 basis and without human supervision or control.

In the current example, when the reflex containment system 18 detects leakage from one or more internal servers I, it is operative to cause the perimeter firewall 16 to automatically block ingress and egress packets of the firewall to the remote destination server IP address to which data is being leaked or to block the internet protocol (IP) address of the leaking internal server, or both, by using a block list 22 provided by reflex containment system 18. The leakage is detected by the reflex containment system 18 by periodically comparing the firewall data traffic 20 to a LAN server metadata (LSM) table 23 of the reflex containment system 18. If leakage is detected, the reflex containment system 18 updates the block list 22 with new IP addresses to be blocked and makes it available to the perimeter firewall 16 as indicated by transport path 22t. The reflex containment system 18 can be a server, a part of a server cluster, a virtual server, or be provided as a cloud service, e.g., by Amazon Web Services (AWS).

In this example, the perimeter firewall 16 can be a commercially available hardware firewall available from a number of manufacturers including Cisco Systems, Fortinet, Palo Alto Networks, and others. In alternate embodiments, perimeter firewall 16 can be implemented as software running on a server, computer, or in the cloud (e.g., in a cloud firewall, such as an AWS firewall, on Internet 12). It will be appreciated that perimeter firewall 16 can comprise any hardware or virtual networking device that has a public network port (facing the internet) and at least one private network port (facing the LAN).

Figure 2:
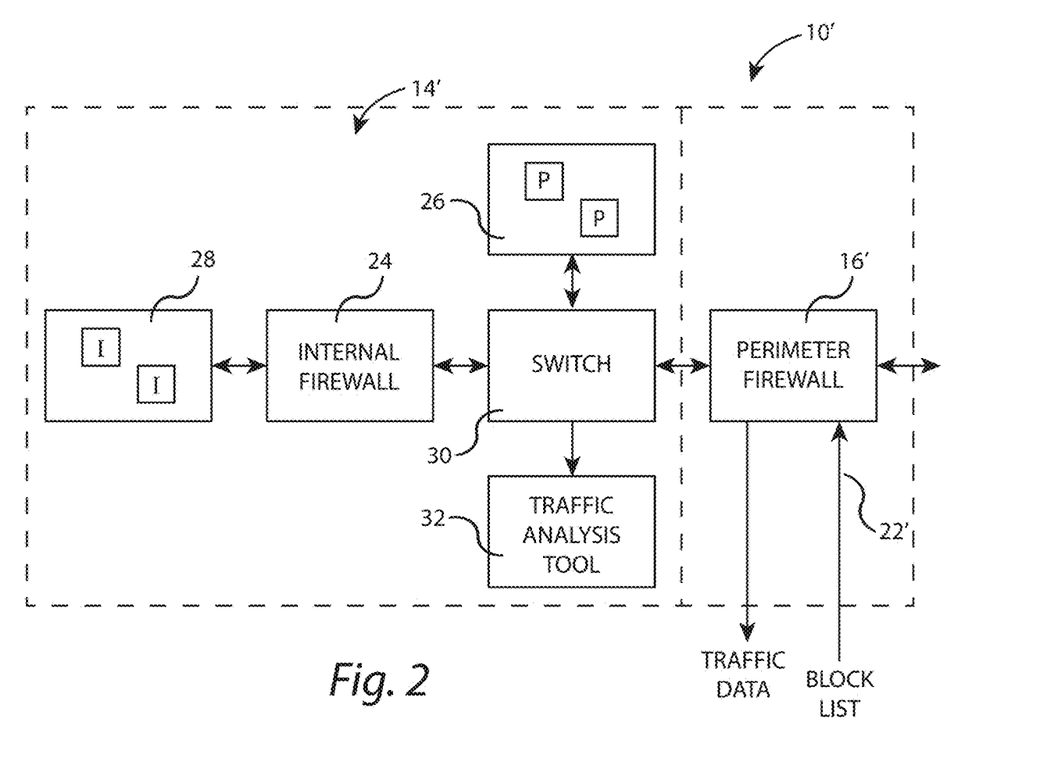
FIG. 2 is a block diagram of a first example segmented LAN of FIG. 1.

FIG. 2 is a block diagram of an example LAN system 10' which uses an internal firewall 24 to separate a demilitarized zone (DMZ) 26 having public-facing servers P from an internal zone (a/k/a "subnet") 28 having internal servers I. As will be appreciated by those of skill in the art, a demilitarized zone or "DMZ" is a perimeter network that protects and adds an extra layer of security to an organization's private internal zone(s). In this example, a switch 30 couples the internal firewall 24 to a perimeter firewall 16'. The DMZ 26 is coupled to the switch 30, along with an optional traffic analysis tool 32. The internal firewall 24 couples the internal zone 28 servers I and other internal zone devices and components, such as user terminals, to the switch 30.

In this example, the DMZ servers P include public-facing servers, resources and services such as web, email, domain name systems, File Transfer Protocol (FTP) and proxy servers. By "public-facing", "external-facing", "internet-facing", etc. it is meant that a server P is designed to be accessible via the internet. DMZs are also known as perimeter networks or screened subnetworks. The servers and resources are accessible through the perimeter firewall 16', but the internal zone 28 servers I remain hard to reach from the internet due to the internal firewall 24. In general, the static IP addresses of the internal servers I should never be seen at the perimeter firewall 16'.

Various types of network monitoring tools (such as traffic analysis tool 32) are used to collect and analyze data about network activity. Among these are "Syslog" and "NetFlow." While these tools serve similar purposes, there are some key differences between them. Syslog is a standard protocol used for forwarding system log messages from one device to another. It is primarily used for collecting log data from various network devices, such as routers, switches, firewalls and servers. Syslog messages contain information about events that occur on the device, including security alerts, system errors, data traffic and other messages. The data is stored in text files and can be analyzed using various tools. NetFlow, on the other hand, is a network protocol developed by Cisco that is used for data traffic analysis and network monitoring. It collects and records information about network traffic flows, including the source and destination addresses, the type of traffic, and the amount of data transferred. NetFlow is used to identify network usage patterns, monitor network performance, and detect security threats.

In terms of similarities, both Syslog and NetFlow are used to collect and analyze data about network activity (e.g., firewall traffic), and both are widely used in network monitoring and management. They provide valuable insights into network performance, security, and usage patterns. However, the main difference between the two is that Syslog focuses on collecting log data, while NetFlow is focused on network traffic analysis. Both Syslog and NetFlow are important tools for network monitoring and management, but they serve different purposes. Syslog is used to collect log data from network devices, while NetFlow is used to analyze network traffic flow.

There are many alternatives to Syslog and NetFlow for network monitoring and management, each with its own strengths and weaknesses. These include sFlow; Simple Network Management Protocol (SNMP); ELK Stack; Graylog; and Wireshark. The choice of tool will depend on the specific needs of the organization, the type of network being monitored, and the level of detail required for analysis.

Figure 3:
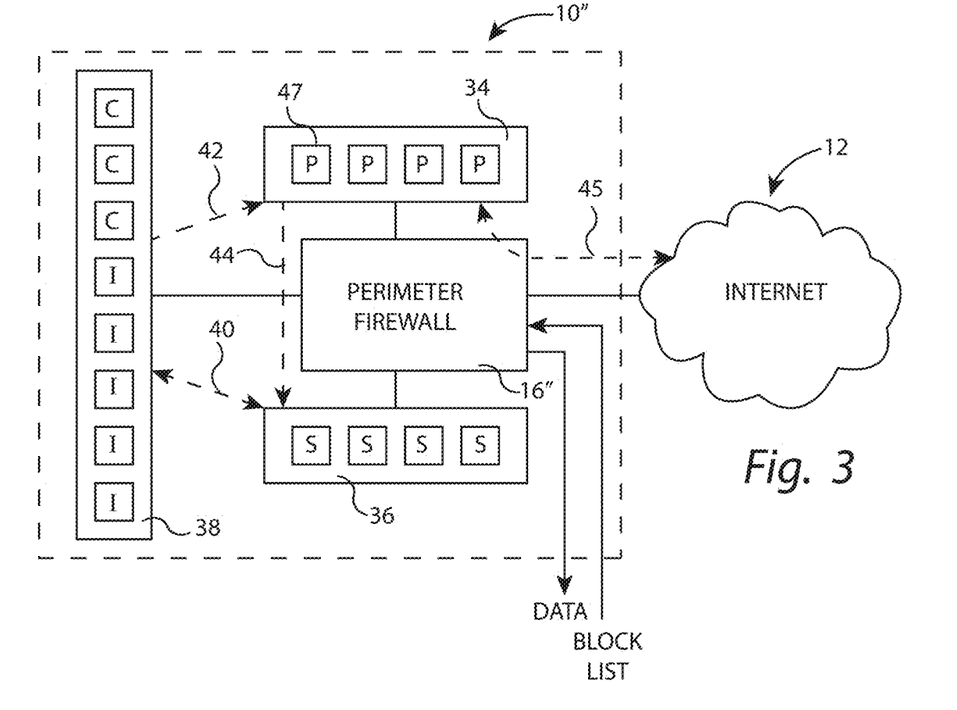
FIG. 3 is a block diagram of a second example segmented LAN of FIG. 1.

FIG. 3 is a block diagram of a LAN system 10" with a single firewall 16". In this example, firewall security zone segmentation is used to keep servers separated into various zones or subnets. More particularly, a single firewall 16" is used two create two DMZ zones, namely a DMZ1 zone 34 and a DMZ2 zone 36, as well as an internal zone 38.

A DMZ zone is an isolated Layer3 subnet. In this example, DMZ1 zone 34 hosts public-facing servers P such as proxy, email and web servers and DMZ2 zone 36 hosts support servers S such as application servers and database servers. Since the public-facing servers P of DMZ1 34 are in direct communication with the internet 12 via perimeter firewall 16", they are the most vulnerable to attack and are therefore separated from the support servers S in DMZ2 zone 36 and from the internal servers I and crown-jewel servers C (internal servers I of very high importance) of internal zone 38, which are isolated from direct internet access.

With this network architecture, the directions of network traffic are limited. For example, bidirectional traffic 40 is permitted between the internal zone 38 and the DMZ2 zone 36, but only one-way traffic 42 is permitted between the internal zone 38 and the DMZ1 zone 34. Since, for example, a web server in DMZ1 zone 34 may need to access a database server of DMZ2 zone 36, communication 44 between DMZ1 and DMZ2 may be required, but is preferably restricted to certain ports. Only the servers P in DMZ1 zone 34 are to be in direct communication with internet 12 as indicated by data packet traffic flow arrow 45.

The internal zone 38 typically includes internal servers I, internal databases, active directory servers, internal applications, as well as workstations and other network devices. A certain number of the internal servers I may be considered to be "crown-jewel" servers C," which may be storing mission critical, proprietary and/or highly confidential information of an organization. Preferably, internet 12 accesses from workstations in internal zone 38 are directed through an HTTP proxy server 47 located in DMZ1 zone 34. As before, the IP addresses of the internal servers I (including crown-jewel servers C) should not be seen in data packets having external destination IP addresses.

Figure 4:
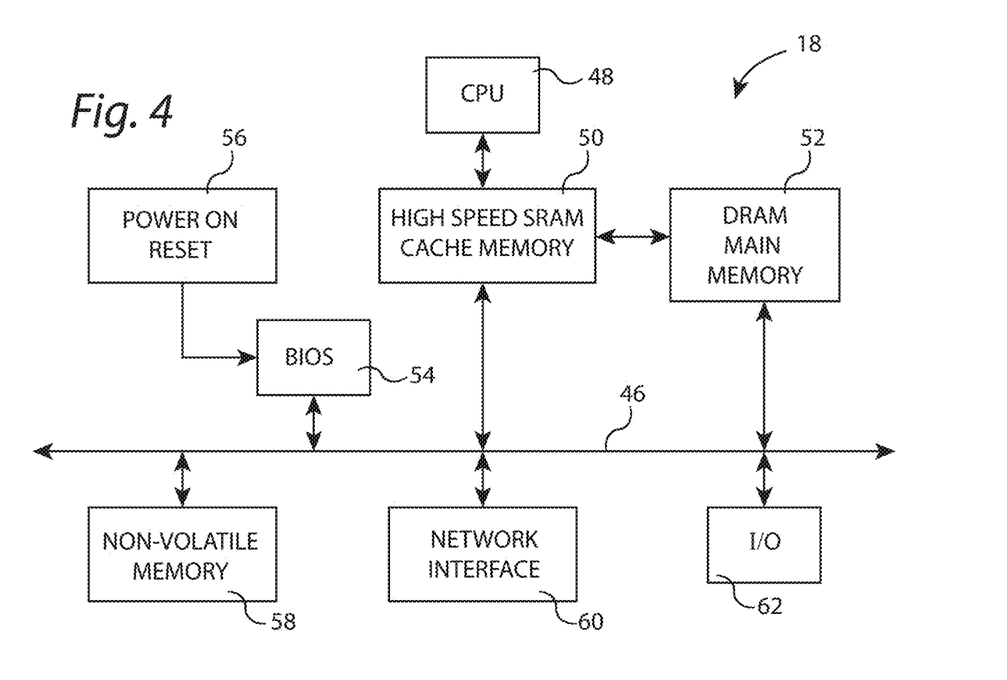
FIG. 4 is a block diagram of an example computer platform for the reflex-reaction server leakage containment system of FIG. 1.

In FIG. 4, an example reflex containment system 18 includes a local bus 46 and a Central Processing Unit (CPU) 48 coupled to the local bus 46 by high-speed Static Random Access Memory (SRAM) cache memory 50. Dynamic Random Access Memory (DRAM) primary or "main" memory 52 is coupled to cache memory 50 and to the bus 46. Basic Input/Output System (BIOS) 54 is coupled to bus 46 and can be reset by power-on reset 56. Leakage control system 18 also includes non-volatile memory 58, such as "flash" memory or a hard drive, network interface 60, and other input/output (I/O) interfaces 62. It will be appreciated that this is only one suitable architecture for reflex containment system 18. For example, the reflex containment system 18 can be implemented on a server or have its functionality be provided by a virtual machine or by cloud computing 18' on the internet, e.g., with Amazon Web Services (AWS).

Figure 5:
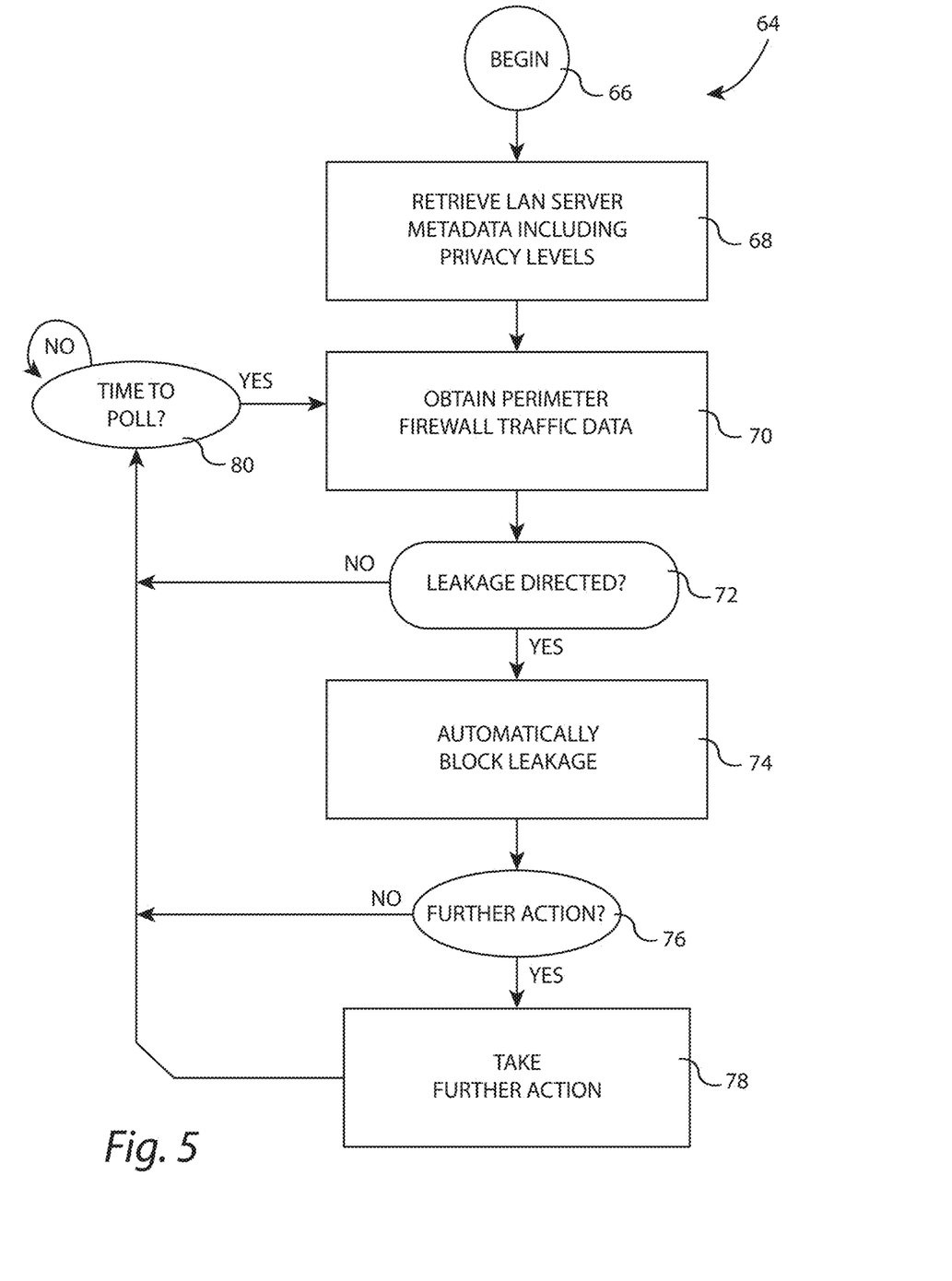
FIG. 5 is a flow diagram of an example method for automatically blocking data leaks from an internal server of a LAN.

FIG. 5 is a flow diagram of an example computer implemented reflex-reaction method or process 64 for automatically blocking data leaks from an internal server of a LAN. Process 64 is typically implemented by the reflex containment system 18, although various operations may be implemented elsewhere, such as in the cloud in internet 12. Process 64 begins at 66 and, in an operation 68, LAN server metadata (LSM) including server IP address(es), IP address range(s), and privacy level(s) is retrieved. With additional reference to FIG. 1, LSM 23 can be stored in the memory of reflex containment system 18 or elsewhere, e.g., in cloud storage on internet 12. The LSM 23 can be provided in the form of a list, table, or other data structure, but at least identifies the static IP addresses of internal servers I, including crown-jewel servers C.

Next, in an operation 70, perimeter firewall traffic data 20 is obtained, such as via a perimeter firewall 16 data stream 20*t* (see FIG. 1). In the current example, firewall traffic data 20 can be transmitted using a syslog forwarding functionality of the perimeter firewall 16. For example, the firewall 16 can be configured to stream syslog messages to the reflex containment system 18 using a TCP or UDP transport protocol supporting a Transport Layer Security (TLS) 1.2 encryption protocol with associated security certificate. The syslog forwarding from perimeter firewall 16, in this example, results in real-time updating of firewall traffic data 20 stored by reflex containment system 18, e.g., typically within a matter of milliseconds. Alternatively, firewall traffic data 20 can be obtained from, for example, traffic analysis tool 32 (see FIG. 2) or elsewhere, albeit at a slower rate.

With continuing reference to FIG. 5, periodically (e.g., every five minutes) the perimeter firewall traffic data and the LAN server metadata are compared in an operation 72. In its simplest form, operation 72 determines if there is outgoing ("egress") internet traffic at the perimeter firewall 16 with the IP address of an internal server. If so, it is determined by operation 72 that there is leakage in the LAN system. By "leakage," "leak" and the like, it is meant that an internal server (which is supposed to be private to the company) is attempting to communicate, or is communicating, or is transferring data through the perimeter firewall 16 to an external destination IP address on the internet 12. Since an internal server should seldom, if ever, be accessed via the internet, an operation 74 automatically ("reflexively") blocks the leakage. By "automatic," "automatically," "reflexively," "reflex," "reflex-reaction," "reflex-like, etc., it is meant that the blocking happens quickly, automatically and without human monitoring or intervention after the detection of leakage in the LAN system 10. This quick, reflex-reaction method greatly reduces the time that a wrongdoer has to compromise and/or exfiltrate data from internal servers I or crown-jewel servers C of the LAN system 10.

When leakage is detected by operation 72, it is automatically blocked by operation 74. In the present example, this is accomplished by updating the block list 22 with the destination IP address(es) on the internet to which the data is leaking. The updated block list 22 can be stored in the reflex containment system 18 or elsewhere, e.g., in a cloud service on internet 12. In the current example, the block list 22 is associated with a uniform resource locator (URL) or IP address which allows perimeter firewall 16 to periodically download the latest version of the block list 22 as indicated by transport path 22t. In a non-limiting example, the Fortinet® Fortigate® firewall uses a feature called External Dynamic List which can be used to poll the URL of block list 22 every 5 minutes for updates.

In its simplest form, any amount of leakage, even one data packet, from an internal server I (and especially from a crown-jewel server C) can be considered to be unauthorized and a serious data breach to be stopped in a reflex-like manner without any further analysis or consideration. There is, however, some delay in the system due to real-world limitations in the operating efficiencies of the perimeter firewall 16 and reflex containment system 18 as well as data channel transmissions of, for example, data 20t and block list 22t. In this example, the block list 22 is updated periodically (e.g., every five minutes or less) by the reflex containment system 18, and the perimeter firewall 16 can be programmed to update its system with the block list 22 periodically (e.g., every five to fifteen minutes), depending upon the firewall. In this example, this results in the reflex containment of the data leak by blocking the destination IP address (e) of the leakage in 1-20 minutes, depending upon timing of the updates, transmission delays, etc.

With continuing reference to FIG. 5, after the leakage has been contained, an operation 76 determines if any post-blocking actions should be taken. If so, further action is taken in operation 78. If no leakage is detected in operation 72, or no further action is required in operation 76, or after the completion of operation 78, it is determined if it is "time to poll?" in an operation 80, e.g., if it is time to analyze the latest perimeter firewall traffic data in an operation 70. As noted previously, polling is typically done at regular intervals, e.g., every five minutes or so. With frequent polling, it is possible to automatically block or contain data leakage of internal servers within a matter of minutes without requiring human monitoring, intervention or control.

Figure 6:
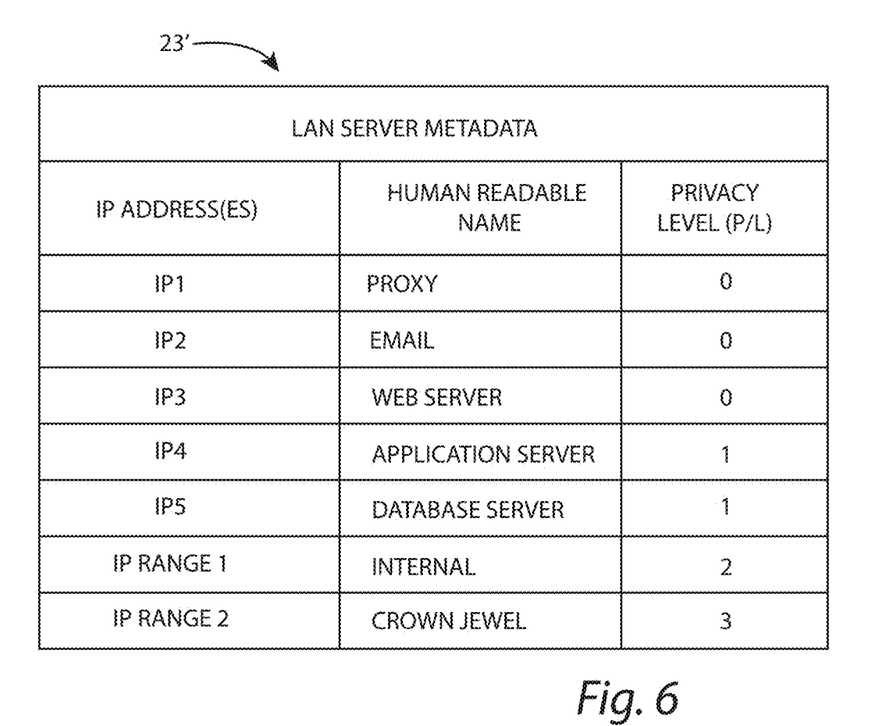
FIG. 6 is a table illustrating example LAN server metadata including internet protocol (IP) addresses and privacy level (P/L)

FIG. 6 is an example LAN Server Metadata (LSM) table 23' including a first column including static internet protocol (IP) addresses or static IP address ranges for LAN servers, a second column including human readable names for the LAN servers, and a third column including privacy levels (P/L) for the LAN servers. In this example, a first server has an IP address of IP1, has the human readable name "PROXY", and has a privacy level of 0. This is a public-facing server and is expected to frequently interact with the internet 12 via the perimeter firewall 16. An email server and a web server with IP addresses IP2 and IP3, respectively, similarly have a privacy level of 0. These three servers can, for example, be servers P in the DMZ1 zone 34 of FIG. 3. An application server and a database server, having IP addresses IP4 and IP5, respectively, both have a privacy level of 1 in this example, and may be located in DMZ2 zone 36 of FIG. 3. While these servers S, which are considered to be sensitive, do not have a direct internet connection, they may occasionally be accessed via DMZ1 zone 34 or internal zone 38. Internal servers I, e.g., those found in internal zone 38, are found in IP address Range 1, and have a privacy level 2 in this example. Internal servers may have important company information up to and including confidential and other proprietary information. Crown-jewel servers C are particularly critical internal servers I that have the highest level of confidentiality, including business plans, strategies, technical trade secrets, etc., and are found in IP address Range 2 with a privacy level 3, in this example. The reflex blocking or containment of packets originating at various LAN servers can occur for any privacy level greater than zero, although the level or reaction can be adjusted depending upon system administrator preferences.

It should be noted that LSM 23' is only one example of a data structure for the LAN server metadata. For example, an LSM could be simply a list of the static IP addresses of internal servers I (including the crown-jewel servers C) with other servers omitted. Alternatively, the internal servers I (including the crown-jewel servers C) could simply be "flagged" as internal servers to distinguish them from other servers in the data structure. Still further, the LAN server metadata could be included in a more extensive database of LAN network devices, where the internal servers I (including the crown-jewel servers) are flagged or otherwise designated as not being public-facing servers P or support servers S.

Figure 7:
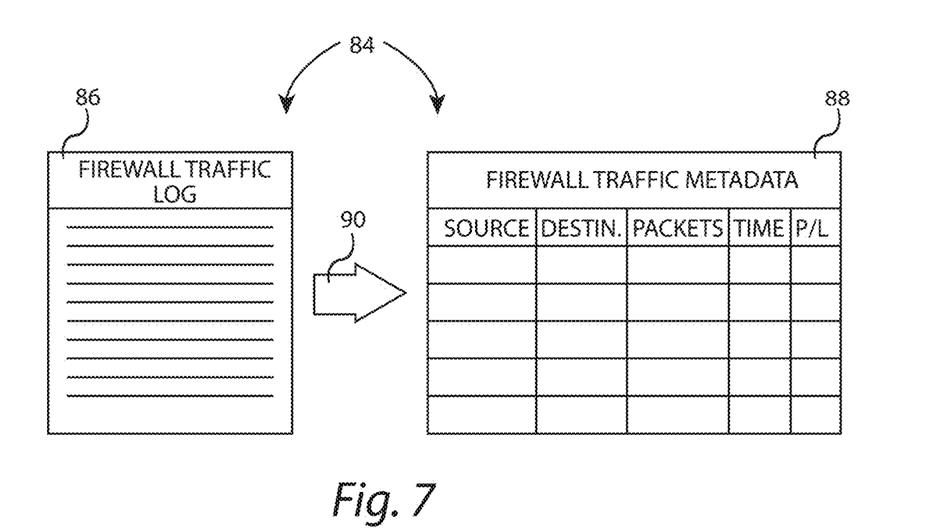
FIG. 7 are tables illustrating example firewall traffic data including a firewall traffic log and firewall traffic metadata.

FIG. 7 are tables illustrating example firewall traffic data 84 including a firewall traffic log 86 and firewall traffic metadata 88. As indicated by arrow 90, firewall traffic metadata 88 can be derived from the firewall traffic log 86, either internally to the LAN system 10 or in the reflex containment system 18. For example, the firewall traffic log 86 may be obtained from a syslog port of the perimeter firewall and processed in a syslog server (e.g., traffic analysis tool 22 of FIG. 2) to create the firewall traffic metadata 88. In the current example, the firewall traffic data 20 is used directly by the reflex containment system 18 to start to populate a firewall traffic metadata table including source IP address, destination IP address, a packet count, a timestamp, and a privacy level (P/L).

Figure 8:
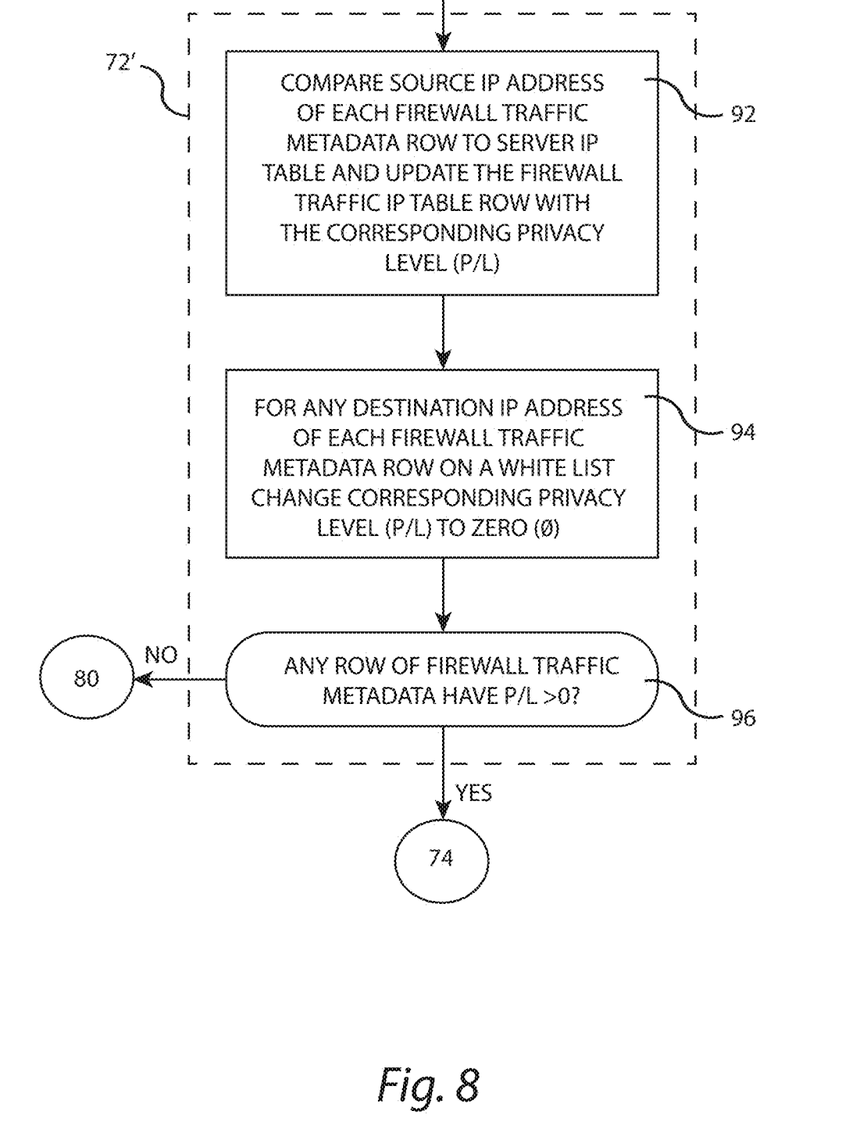
FIG. 8 is a flow diagram of an example method for determining if there is leakage from an internal server of a LAN.

FIG. 8 is a flow diagram of an example method 72' (see also FIG. 5) for determining if there is leakage from an internal server of a LAN. In an operation 92, a comparison is made of the source IP addresses of egress network packets with respect to the LAN Server Metadata 23. Next, in an operation 94, if any destination IP address in the firewall traffic metadata is on a "whitelist", the firewall traffic metadata table 88 for that destination IP address has its privacy level (P/L) set to zero. This is because occasionally an internal server is to be temporarily accessed via the internet to, for example, perform a cloud backup of the server. Finally, in an operation 96, it is determined whether any row of the firewall traffic metadata has a P/L>0 (e.g., 1, 2 or 3 in this example). If so, with additional reference to FIG. 5, process control is directed to operation 74 and, if not, process control is directed to operation 80.

Figure 9:
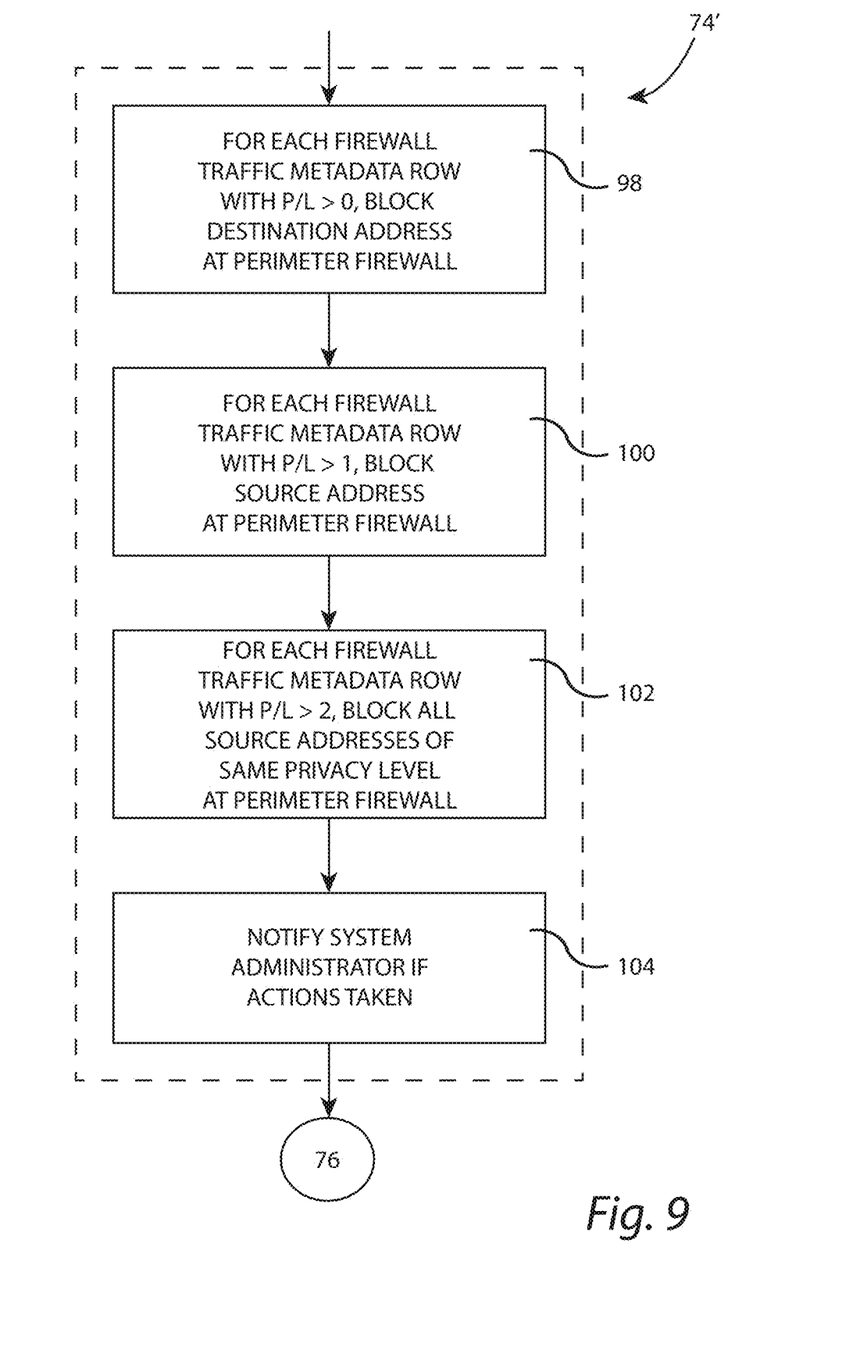
FIG. 9 is a flow diagram of an example method for automatically blocking leakage from an internal server of a LAN.

FIG. 9 is a flow diagram of an example method 74' for automatically blocking leakage from an internal server of a LAN. See also, FIG. 5. In an operation 98, for each firewall traffic metadata row with a P/L>0, the destination IP address (es) on the internet 12 are blocked at the perimeter firewall. The destination address blocking is preferably for both egress and ingress packets that include the destination IP address. Next, in an operation 100, for each firewall metadata row with P/L>1, the source address is also blocked at the perimeter firewall. Then, in an operation 102, for each firewall metadata row with P/L>2, all source local server IP addresses of the same privacy level are blocked at the perimeter firewall. Finally, in an operation 104, the network administrator is notified of actions taken, e.g., by email or text messages.

If will be appreciated that, in this non-limiting example, the reflex-like response to the detection of internal server leakage depends, in this example, upon the privacy level (P/L) associated with the leaking server. With a privacy level 1, the destination IP address is blocked at the perimeter firewall, allowing access to the local server by other destination IP addresses that may be, for example, on a whitelist. With privacy level 2 both the destination IP address and the original IP address of the leaking local server are blocked. This is often referred to as "full containment" and prevents malicious agents from attempting to gain access to the affected internal server from other destination IP addresses. Crown-jewel local servers (having a P/L of 3) indicate that a serious breach is underway, and all of the crown-jewel local servers are additionally contained by blocking their origination IP addresses at the perimeter firewall. In other examples, all internal servers I (including crown-jewel servers C) are treated the same, e.g., if any source IP address that is flagged as being an internal server is found in even a single data packet at the perimeter firewall 16, there is a reflex-reaction by the system to automatically block the destination IP address(es).

Figure 10:
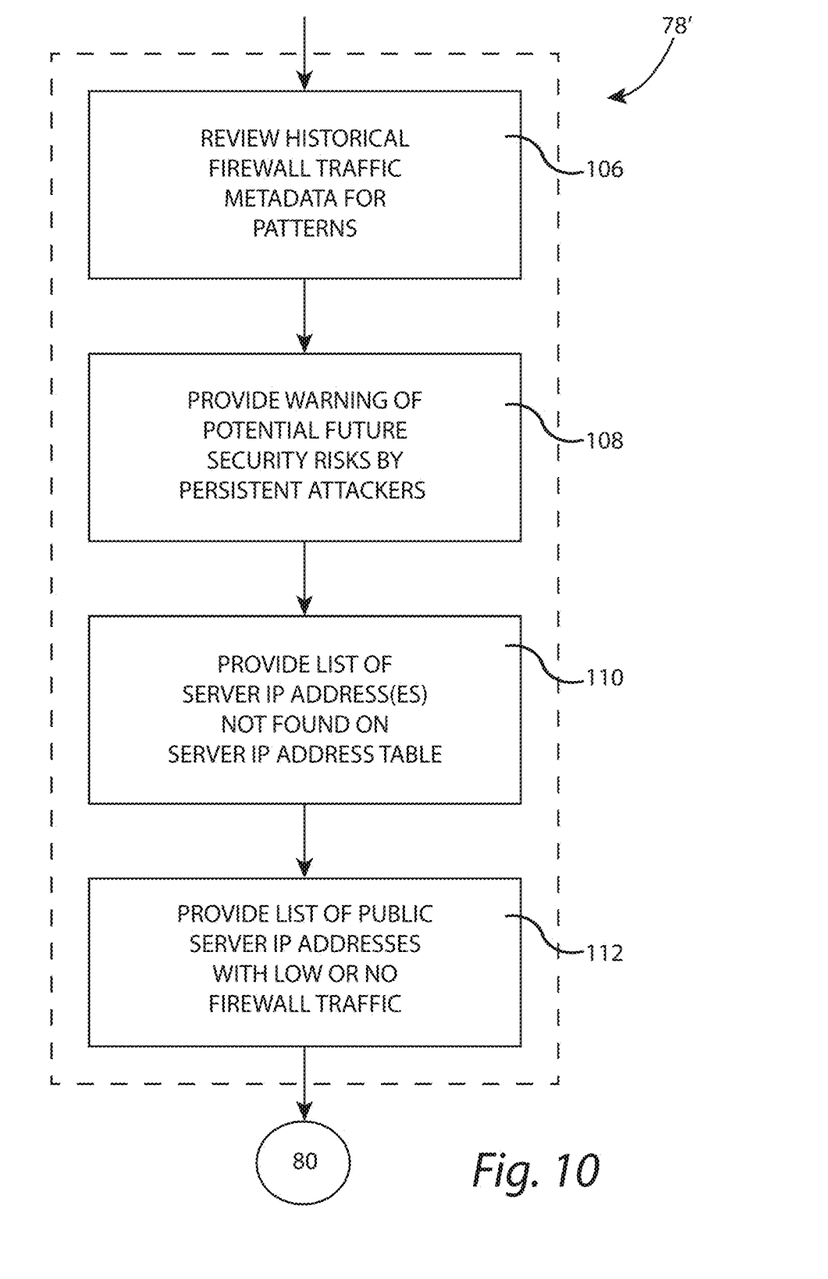
FIG. 10 is a flow diagram of example further actions that can be taken after automatically blocking leakage from an internal server of a LAN.

FIG. 10 is a flow diagram of example further actions 78' (see also FIG. 5) that can be taken after automatically blocking leakage from an internal server of a LAN. In an operation 106, historical firewall traffic metadata tables are reviewed for patterns. Since, in this example, the firewall traffic metadata tables are generated about every five minutes (due to the polling operation 80), patterns can be detected over minutes, hours, day and weeks, etc., that may indicate a persistent intruder. That is, if an internal server shows leakage and then a lateral internal server begins to show leakage in the next few days, it may be that a persistent intruder has penetrated the LAN system. In an operation 108, warnings of potential future security risks can be reported to system administrators. Also, in an operation 110, a list of server IP addresses not found on the LAN Sever Metadata table can be provided which can be reported to the system administrator. As a final example, an operation 112 can determine if any public-facing servers (P/L=0) have little or no historical traffic and report to the system administrator to determine if they should be removed from the system or recategorized as an internal server (e.g., P/L>0).

Another example of further actions 78 is storing at least a full day of firewall traffic data in a temporary storage bucket on a server or in the cloud to perform real-time analysis and reporting. For example, Amazon Simple Storage Service (S3), which is a part of Amazon Web Services (AWS), is an object storage service that offers scalability, data availability, security and performance. After the day's storage, the data can be moved to a Data Lake environment and summarized and consolidated and stored, for example, 30 days, 90 days, or even a year in summarized form. A data lake is a centralized repository that allows for the storage of structured and unstructured data at any scale and is also available from AWS. A purpose of the longer storage intervals is to facilitate reporting of the data for historical reports.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

The invention claimed is:

1. A segmented local area network with reflex-reaction server leakage containment system comprising:
   a segmented local area network (LAN) including an internal zone with at least one internal server having an internal internet protocol (IP) address, the LAN further including a perimeter firewall connecting the LAN to the internet, the perimeter firewall developing a syslog message data stream and being responsive to a block list of IP addresses; and
   a reflex-reaction server leakage containment system separate from the LAN and connected to the internet, the reflex-reaction server leakage system,
   (a) receiving the syslog message data stream from the perimeter firewall of the LAN via an encrypted internet transport protocol;
   (b) deriving perimeter firewall traffic data from the syslog message data stream;
   (c) comparing the perimeter firewall traffic data to stored LAN server metadata that includes the IP address of the at least one internal server; and
   (d) when the IP address of the at least one internal server is detected in the syslog data stream by the comparing of the perimeter firewall traffic data to the stored LAN server metadata, automatically updating the block list for the perimeter firewall without further analysis with at least one of the IP address of the at least one internal server and an IP address of an external destination server communicating with the at least one internal server and otherwise leaving the block list for the perimeter firewall unchanged.

2. The segmented local area network with reflex-reaction server leakage containment system as recited in claim 1, wherein the reflex-reaction server leakage containment system determines if there is data leakage by periodically comparing the perimeter firewall traffic data to the LAN server metadata.

3. The segmented local area network with reflex-reaction server leakage containment system as recited in claim 2, wherein the LAN is segmented with an internal firewall.

4. The segmented local area network with reflex-reaction server leakage containment system as recited in claim 3, wherein the LAN includes a switch coupling the internal firewall to the perimeter firewall.

5. The segmented local area network with reflex-reaction server leakage containment system as recited in claim 4, wherein the LAN includes at least one demilitarized zone (DMZ) server coupled to the switch and wherein the at least one internal server is coupled to the switch by the internal firewall.

6. The segmented local area network with reflex-reaction server leakage containment system as recited in claim 5, wherein the at least one DMZ server is a public-facing server with internet access.

7. The segmented local area network with reflex-reaction server leakage containment system as recited in claim 6, wherein the internal servers are private servers without internet access.

8. The segmented local area network with reflex-reaction server leakage containment system as recited in claim 7, wherein the LAN further includes a traffic analysis tool coupled to the switch.

9. The segmented local area network with reflex-reaction server leakage containment system as recited in claim 1, wherein the LAN is segmented by the perimeter firewall.

10. The segmented local area network with reflex-reaction server leakage containment system as recited in claim 9, wherein the perimeter firewall is coupled to at least one demilitarized zone (DMZ) server.

11. The segmented local area network with reflex-reaction server leakage containment system as recited in claim 10, further comprising a first DMZ (DMZ1) zone including DMZ1 servers and a second DMZ (DMZ2) zone including DMZ2 servers.

12. The segmented local area network with reflex-reaction server leakage containment system as recited in claim 11, wherein the DMZ1 servers are public-facing servers designed to communicate over the internet via the perimeter firewall.

13. The segmented local area network with reflex-reaction server leakage containment system as recited in claim 12, wherein the internal servers have one-way communication with the DMZ1 servers.

14. The segmented local area network with reflex-reaction server leakage containment system as recited in claim 13, wherein the internal servers have two-way communication with the DMZ2 servers.

15. The segmented local area network with reflex-reaction server leakage containment system as recited in claim 1, wherein the reflex-reaction server leakage containment system includes a processor and memory.

16. The segmented local area network with reflex-reaction server leakage containment system as recited in claim 1, wherein the reflex-reaction server leakage containment system is a cloud-based system.

* * * * *